Figure 4:
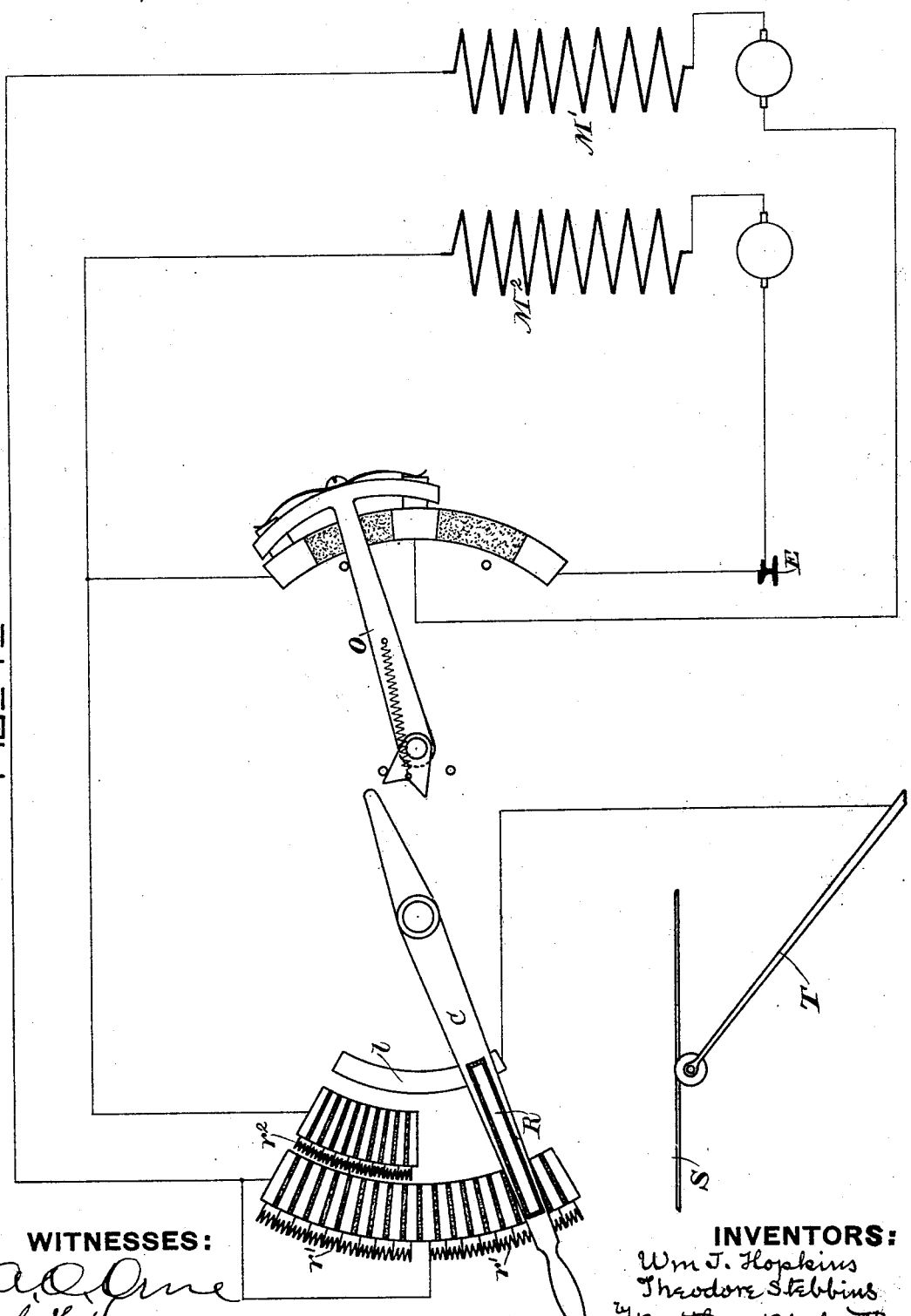

(No Model.) 3 Sheets—Sheet 1.
W. J. HOPKINS & T. STEBBINS.
ELECTRIC MOTOR CONTROLLER.
No. 520,784. Patented June 5, 1894.
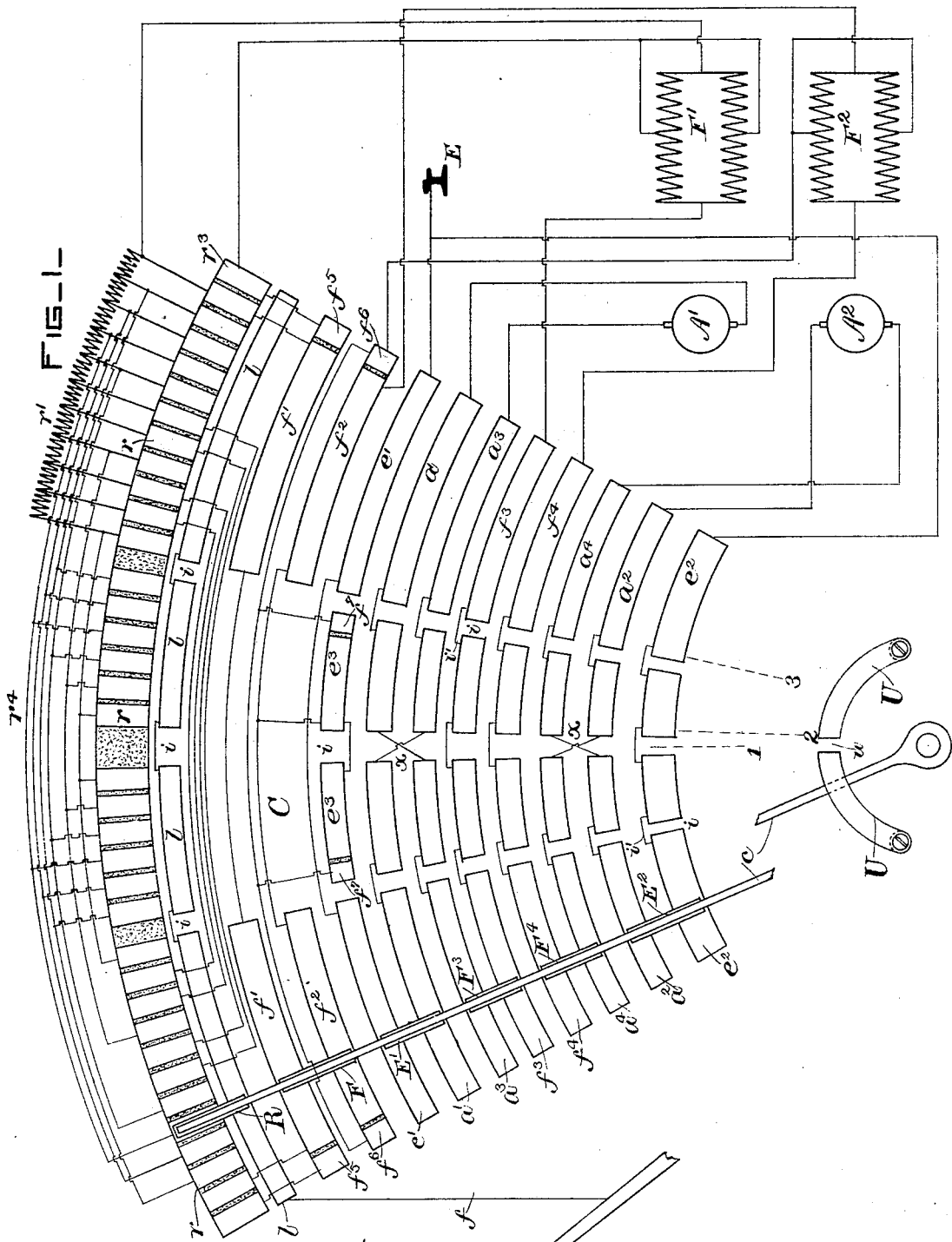
WITNESSES:
A. O. Orne
C. L. Haynes
INVENTORS:
Wm J. Hopkins
Theodore Stebbins
by Bentley & Blodgett
ATTYS.

(No Model.) 3 Sheets—Sheet 2.
W. J. HOPKINS & T. STEBBINS.
ELECTRIC MOTOR CONTROLLER.
No. 520,784. Patented June 5, 1894.
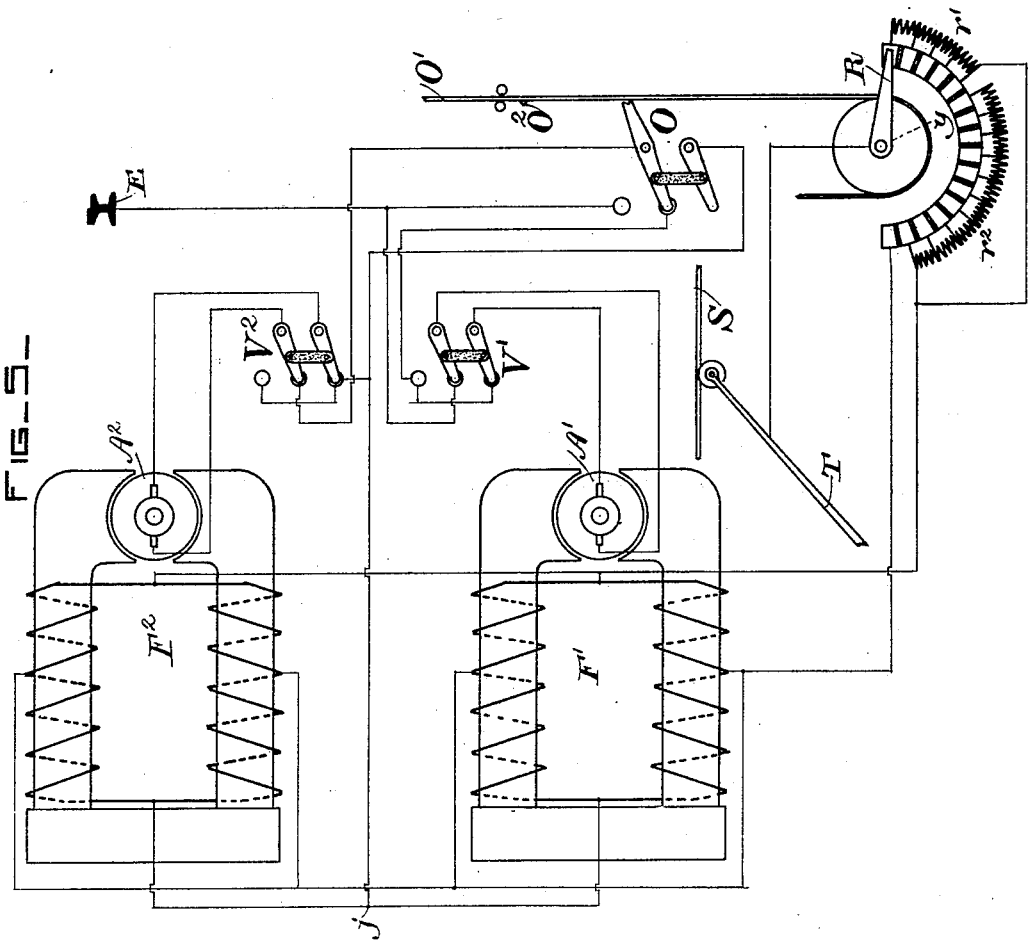
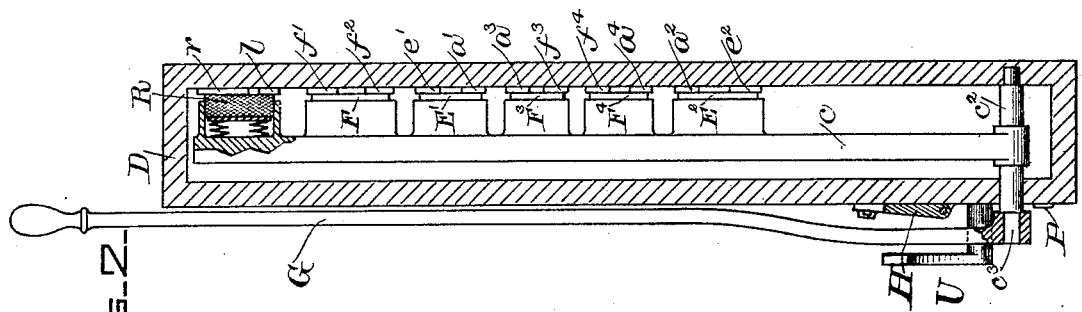
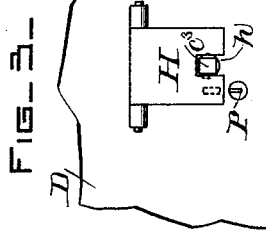
WITNESSES:
INVENTORS:
Wm. J. Hopkins
Theodore Stebbins
by Bentley & Blodgett
ATTYS.

(No Model.) 3 Sheets—Sheet 3.

W. J. HOPKINS & T. STEBBINS.
ELECTRIC MOTOR CONTROLLER.

No. 520,784. Patented June 5, 1894.

WITNESSES:
INVENTORS:
Wm J. Hopkins
Theodore Stebbins
by Bentley & Blodgett
ATTYS.

UNITED STATES PATENT OFFICE.

WILLIAM J. HOPKINS AND THEODORE STEBBINS, OF BOSTON, MASSACHUSETTS, ASSIGNORS TO THE THOMSON-HOUSTON ELECTRIC COMPANY, OF CONNECTICUT.

ELECTRIC-MOTOR CONTROLLER.

SPECIFICATION forming part of Letters Patent No. 520,784, dated June 5, 1894.

Application filed September 19, 1891. Serial No. 406,176. (No model.)

*To all whom it may concern:*

Be it known that we, WILLIAM J. HOPKINS and THEODORE STEBBINS, citizens of the United States, residing at Boston, in the county of Suffolk and State of Massachusetts, have invented certain new and useful Improvements in Methods of and Means for Controlling Electric Motors, of which the following is a specification.

This invention relates to electric motor controllers and is designed for use on electric railway cars where two motors are employed, and where variations in speed are obtained by changing the relation of the motors from series to multiple or vice versa. Our invention consists therefore in a method of and means for accomplishing this in a simple and efficient manner while graduating the steps so as to prevent too violent transitions. We also provide for reversal of the motors through the same operating device that controls the speed.

In the accompanying drawings, Figure 1 is a diagram of the preferred form of our controller with its circuit connections. Fig. 2 is a vertical section of the controller. Fig. 3 shows a detail and Figs. 4 and 5 are diagrams of modifications.

In Fig. 1 S represents an electric supply line, such as a trolley wire, from which the current is led by a connection, as through a trolley T and connected wiring $f$ to the controller C. From such controller, connections are made to the field magnets $F'$, $F^2$ and armatures $A'$, $A^2$ of two electric motors which may be connected respectively to the two axles of a car. Said controller also has an earth or return connection E.

The controller comprises a controlling or contact arm $c$, movable either way from a central position in which all circuits controlled by it are broken, and two sets of contacts, on opposite sides of and symmetrical with regard to such central position of the arm. This duplication of the contacts is simply to cause the reversal of the motors as the contact arm is moved from one side to the other, while the operation of the contacts in controlling the speed of the motors remains the same. The two sets of contacts and their connections are therefore identical or symmetrical, except that the armature connections are reversed. The aforesaid contacts consist of line contact $l$ and rheostat contacts $r$, traversed and connected by brush R, field contacts $f^3$, $f^4$, armature contacts $a'$, $a^2$, $a^3$, $a^4$, and ground contacts $e'$, $e^2$. The contacts $l, f', f^2$ are simply for the purpose of putting the several brushes in circuit, and they might therefore extend throughout the path of the contact arm, it is however preferable to divide or break them at certain points $i$, where the contact arm effects a marked change in the circuit relations, such gaps being bridged by connections $i'$. Such gaps are not absolutely necessary but serve to increase the number of breaking points and to thus diminish flashing and the chances of short-circuiting. Brush 'E' bears on contacts $a'$, $e'$ and serves to ground one or other end of armature $A'$ according to which way it is thrown. Brush $E^2$ does the same thing for armature $A^2$ by connecting contacts $a^2$, $e^2$. Similarly brushes $F^3$, $F^4$ connect contacts $a^3$, $f^3$ and $a^4$, $f^4$ respectively, so as to effect corresponding reversals at the field ends of the armatures. The changing of the motor connections from series to multiple is effected by contacts $f'$, $f^2$, $e'$, $e^3$. When the arm is in the central position indicated by dotted line 1—1, all circuits are broken, when moved to the position of line 2—2, the current passes from the line S to trolley T, to line contact $l$, brush R, rheostat contact $r$, through all of the resistances $r'$ to field magnet $F'$, contact $f^3$, brush $F^3$, contact $a^3$, armature $A'$, contact $a'$, brush $E'$, contact $e^3$, field magnet $F^2$, contact $f^4$, brush $F^4$, contact $a^4$, armature $A^2$, contact $a^2$, brush $E^2$, contact $e^2$, to ground. The two motors are thus placed in series with the maximum of resistance in circuit therewith, which is the condition best adapted for starting the car. By moving the arm farther to the right, the resistance coils $r'$ are successively cut out, thus increasing the speed of the motor to a certain extent. To still further increase the speed, the arm is thrown still farther so as to cross the breaking spaces $i$, and come to the position of line 3, thereby putting the motors in multiple arc.

The current passes from the line through contact $l$ and resistances $r'$, as before, but divides at contacts $f'$, $f^2$, connected by brush F, part going to field magnet F', contact $f^3$, brush $F^3$, contact $a^3$, armature A', contact $a'$, brush E', contact $e'$, to ground E, and part going from contact $f^2$ to field magnet $F^2$, contact $f^4$, brush $F^4$, contact $a^4$, armature $A^2$, contact $a^2$, brush $E^2$, contact $e^2$ to ground E. Then by continuing to move the arm to the right, the resistances are cut out as before and the motors continue to increase in speed. A final additional increase may be given by cutting out a portion or loop of the field magnet, by means of contacts $f^5$, $f^6$, $r^3$. When the arm is over them, connections are made from line contact $l$ directly, through contacts and brushes $l$, L, $r^3$ and $l$, L, $r^3$, $f^5$, F, $f^6$ to intermediate portions of the field magnets, similarly a contact $f^7$ may be provided at end of contact $e^3$ which accomplishes a similar result for field magnet $F^2$ when the magnets are in series, so as to give an additional intermediate step. When the controller arm is thrown to the other side the results effected are the same, except that the armature connections are reversed, the contact plates $a'$, $a^2$, $a^3$, $a^4$ for the armatures crossing or exchanging connections as shown at $x$. It is desirable to use but one set of resistances as shown at $r'$ and run multiple connections as shown at $r^4$ to the four different portions of the controller representing certain circuit conditions. Thus the same resistance that is used with the motors in series is also used when the motors are in multiple, and also serves for both directions of motion. The gaps between the contacts and between the several portions of contacts should be wide enough to prevent the contact brushes from bridging them.

The construction of the switch is indicated in Figs. 2 and 3, D being a casing, box or stand wherein the controller arm $c$, plays over the contacts $f'$, $f^2$, &c., fastened to the back of the box. Such arm is carried by a spindle $c^2$ passing through the front of the box and provided with a shank or holding portion engaging with the operating arm G, by any suitable expedient, such as a square end $c^3$ engaging in a square socket in the arm G.

In order to retain the contact arm in the central safe position when the arm G is for any reason removed, a lock may be provided consisting of a hinged lock plate H, having a socket $h$, fitting over the spindle end $c^3$ when in such central position, and holding it from displacement until released by throwing the plate up as indicated. Such lock may be provided with a latch and key fastening P, to prevent unauthorized tampering with it, the key being in possession of the motor man.

In order to more fully explain our invention, we have shown a simplified form in Fig. 4, wherein the reversing connections are omitted, the controller being adapted to simply change the relations of the motors from series to multiple or the reverse, while graduating such changes by inserting or cutting out resistances. Here a single contact brush R connected to line, sweeps over two sets of rheostat contacts connected respectively through resistances $r'$, $r^2$ to one end of each of the motors M', $M^2$. A three way switch O is provided which connects the other end of motor M' either to ground E or to the motor $M^2$. The second terminal of motor $M^2$ is connected to ground. In the position shown, the current passes from the line S and trolley to the line contact $l$, to the contact brush R, rheostat contact and resistance $r'$, motor M', through the three way switch O to motor $M^2$ and ground. By moving arm C to the left, the resistance is gradually cut out and just before contact with rheostat $r^2$ is made the three way switch is thrown, preferably by a snap action, as shown, to ground motor M' directly. Contact with the rheostat $r^2$ having been made, the current passes through the two motors in multiple, in obvious manner.

Fig. 5, shows a form wherein only the armature relations are changed from series to multiple, the field magnets remaining in multiple. In this case the starting current is from line to arm R, to rheostat $r'$, to field magnets F', $F^2$ in multiple, to reversing switch $V^2$ for armature $A^2$, to said armature, to three way switch O, to reversing switch V', armature A', and thence to ground. When the switch is turned to dotted line $y$, it comes on to resistance $r^2$, and at the same time shifts the three way switch to connect the field magnet junction $j$, directly with armature A', and to connect armature A' directly with ground E, the reversing switches being included as before. This puts the armatures in multiple and the rheostat $r^2$ may be then more or less cut out to further increase the speed. The three way switch is shown as operated from the controller arm, by cable O' and toe $O^2$. In each of the above modifications, however, it is obvious that without departing from our invention the said switches could be operated by separate manual devices.

Our invention may be carried out in other forms or modifications than those above described, without departing from the general principle of operation, namely, starting from a normal condition of open circuit, throwing two motors in series with one another and with a rheostat, cutting out the rheostat, changing the motor connections to multiple while re-inserting the rheostat and again cutting out the rheostat.

It is apparent that the same general method of operation is also applicable to more than two motors, for example four motors could be divided up into two pairs, and the above method of coupling could be applied both to the pairs as units, and to the motors of each pair. In other words, the term motor, in the above connection may cover any number of motors, whose inter-connections may either be permanent or variable.

In Figs. 1 and 2, U represents a guard to prevent the handle G from being removed except when in the central, safe position. This guard consists of wings or arms extending out over the path of the handle with a central gap or space $u$, through which the handle may be passed.

What we claim as new, and desire to secure by Letters Patent, is—

1. The method herein set forth of controlling electric motors, which consists in first connecting them in series with a resistance, gradually cutting out the resistance, connecting the motors in multiple and simultaneously reinserting the resistance in series therewith, and finally gradually cutting out the resistance.

2. A controlling apparatus for electric motors, comprising a fixed contact connected to one side of the circuit, a rheostat in circuit with the motor terminals, a transfer switch for changing the motors from series to multiple connection, and a common operating device for cutting down the resistance, throwing the transfer switch and simultaneously inserting resistance, and then again cutting down the resistance with the motors in multiple, as set forth.

3. In a controlling apparatus for electric motors, the combination with a rheostat and contacts therefor, of a switch comprising contacts for changing the motors from series to parallel connection, a contact connected to the line terminal, a break or breaks therein for breaking the circuit at the time the said change is made, movable contacts for effecting the various connections between the line terminal contact and the other contacts and a common actuator for said movable contacts, as set forth.

4. In a controlling apparatus for electric motors comprising a set of fixed contacts adapted to connect the motors in series, a set of fixed contacts adapted to connect the motors in parallel, a rheostat and fixed contacts therefor, and a set of movable contacts adapted to successively bridge said sets of contacts, the means for simultaneously breaking the circuit at two or more different points at the moment when said movable contacts are transferred from one of said sets of fixed contacts to the other, as set forth.

5. In a controlling apparatus for electric motors, the combination, with contacts for connecting the motors in series, of contacts for connecting the motors in parallel, a rheostat, a set of contacts connected thereto adapted to be cut out of circuit while the motors are in series, and a second set of contacts connected thereto adapted to be cut out while the motors are in parallel, whereby the same resistance is successively used during the operation of the controller, as set forth.

6. In a controller for electric motors, the combination, with a movable member, of a removable actuator therefor, means for preventing the removal of said actuator except at a certain predetermined position, and a device for locking said movable member in said predetermined position when said actuator is removed, as set forth.

7. A controller for electric motors or other apparatus having a movable contact arm mounted on a spindle, a removable operating arm engaging with said spindle and a locking detent for engaging with said spindle and holding it from rotation when said operating arm is removed.

8. A controller for electric motors or other apparatus having a movable contact arm, a removable actuator engaging therewith, and a detent adapted to lock the contact arm when the actuator is removed.

9. A controller for electric motors or other apparatus having a movable contact arm, a removable actuator engaging with a part attached to said arm, and a locking detent engaging with such part when the actuator is removed, as and for the purpose set forth.

In witness whereof we have hereunto set our hands this 17th day of September, 1891.

WILLIAM J. HOPKINS.
THEODORE STEBBINS.

Witnesses:
A. P. KNIGHT,
N. F. HAYES.